United States Patent
Xiang et al.

(10) Patent No.: US 12,078,035 B2
(45) Date of Patent: Sep. 3, 2024

(54) ELASTOMER ALLOY FOR INTELLIGENT SAND MANAGEMENT

(71) Applicant: Schlumberger Technology Corporation, Sugar Land, TX (US)

(72) Inventors: Jinglei Xiang, Lawrence, KS (US); Jason Holzmueller, Lawrence, KS (US); Xiaohong Ren, Sugar land, TX (US); Jushik Yun, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/247,758

(22) PCT Filed: Oct. 11, 2021

(86) PCT No.: PCT/US2021/054334
§ 371 (c)(1),
(2) Date: Apr. 4, 2023

(87) PCT Pub. No.: WO2022/081440
PCT Pub. Date: Apr. 21, 2022

(65) Prior Publication Data
US 2023/0416594 A1    Dec. 28, 2023

Related U.S. Application Data

(60) Provisional application No. 63/091,248, filed on Oct. 13, 2020.

(51) Int. Cl.
*E21B 43/08* (2006.01)
*C08J 9/00* (2006.01)
(Continued)

(52) U.S. Cl.
CPC .......... *E21B 43/082* (2013.01); *C08J 9/0061* (2013.01); *C08J 9/0066* (2013.01); *C08J 9/08* (2013.01);
(Continued)

(58) Field of Classification Search
CPC ...................................... E21B 43/082
See application file for complete search history.

(56) References Cited

U.S. PATENT DOCUMENTS 2,981,332 A * 4/1961 Miller ............... E21B 43/04
166/228
2,981,333 A * 4/1961 Miller ............... F16L 55/24
166/228

(Continued)

FOREIGN PATENT DOCUMENTS

CA    2969518 A1    6/2016
CN    2343338 Y    10/1999
(Continued)

OTHER PUBLICATIONS

International Search Report and Written Opinion issued in the PCT Application PCT/US2020/018495, dated Jun. 12, 2020 (15 pages).
(Continued)

*Primary Examiner* — Jennifer H Gay
(74) *Attorney, Agent, or Firm* — Jeffrey D. Frantz

(57) ABSTRACT

An elastomer alloy includes a base polymer including hydrogenated nitrile butadiene rubber (HNBR) and at least one secondary polymer, which is at least one of paraffin wax, low-density polyethylene (LDPE), linear low-density polyethylene (LLDPE), high-density polyethylene (HDPE), and a plastomer. The base polymer and the at least one secondary polymer are blended into a polymer matrix. The elastomer
(Continued)

alloy also includes a plurality of smart fillers dispersed within the polymer matrix, at least one chemical foaming agent, and a curing activator.

19 Claims, 7 Drawing Sheets

(51) Int. Cl.
- C08J 9/08 (2006.01)
- C08J 9/10 (2006.01)
- C08L 15/00 (2006.01)

(52) U.S. Cl.
CPC ............ *C08J 9/103* (2013.01); *C08L 15/005* (2013.01); *C08J 2201/026* (2013.01); *C08J 2203/02* (2013.01); *C08J 2203/04* (2013.01); *C08J 2203/18* (2013.01); *C08J 2205/05* (2013.01); *C08J 2315/00* (2013.01); *C08J 2323/06* (2013.01); *C08L 2201/08* (2013.01); *C08L 2203/14* (2013.01); *C08L 2205/06* (2013.01); *E21B 2200/08* (2020.05)

(56) References Cited

U.S. PATENT DOCUMENTS

| | | |
|---|---|---|
| 3,099,318 A | 7/1963 | Miller et al. |
| 3,712,373 A | 1/1973 | Bearden et al. |
| 3,816,894 A | 6/1974 | Howard et al. |
| 3,901,320 A | 8/1975 | Calderon et al. |
| 4,917,183 A | 4/1990 | Gaidry et al. |
| 5,310,000 A | 5/1994 | Arterbury et al. |
| 5,782,299 A | 7/1998 | Simone et al. |
| 5,913,365 A | 6/1999 | Bryant |
| 6,216,788 B1 | 4/2001 | Wilson |
| 6,543,545 B1 | 4/2003 | Chatterji et al. |
| 6,607,032 B2 | 8/2003 | Voll et al. |
| 6,695,054 B2 | 2/2004 | Johnson et al. |
| 6,766,862 B2 | 7/2004 | Chatterji et al. |
| 6,841,582 B2 | 1/2005 | Morikawa et al. |
| 6,935,432 B2 | 8/2005 | Nguyen |
| 7,013,979 B2 | 3/2006 | Richard |
| 7,048,048 B2 | 5/2006 | Nguyen et al. |
| 7,168,485 B2 | 1/2007 | Johnson et al. |
| 7,258,166 B2 | 8/2007 | Russell |
| 7,318,481 B2 | 1/2008 | Richard |
| 7,373,991 B2 | 5/2008 | Vaidya et al. |
| 7,493,947 B2 | 2/2009 | Ross |
| 7,581,586 B2 | 9/2009 | Russell |
| 7,644,773 B2 | 1/2010 | Richard |
| 7,665,538 B2 | 2/2010 | Robisson et al. |
| 7,703,520 B2 | 4/2010 | Dusterhoft |
| 7,743,835 B2 | 6/2010 | Willauer |
| 7,814,973 B2 | 10/2010 | Dusterhoft et al. |
| 7,828,055 B2 | 11/2010 | Willauer et al. |
| 7,832,490 B2 | 11/2010 | Willauer |
| 7,841,409 B2 | 11/2010 | Gano et al. |
| 7,861,787 B2 | 1/2011 | Geoffresell |
| 7,866,383 B2 | 1/2011 | Dusterhoft et al. |
| 7,926,565 B2 * | 4/2011 | Duan ............... E21B 43/082 |
| | | 166/278 |
| 7,967,596 B2 | 6/2011 | Livi |
| 7,984,760 B2 | 7/2011 | Haeberle et al. |
| 8,048,348 B2 | 11/2011 | Duan et al. |
| 8,127,831 B2 | 3/2012 | Haeberle et al. |
| 8,196,653 B2 | 6/2012 | Fripp et al. |
| 8,245,778 B2 | 8/2012 | Yeh et al. |
| 8,256,510 B2 | 9/2012 | Holderman et al. |
| 8,291,972 B2 | 10/2012 | Dusterhoft et al. |
| 8,302,681 B2 | 11/2012 | Fripp et al. |
| 8,316,952 B2 | 11/2012 | Moen |
| 8,365,833 B2 | 2/2013 | Carrejo et al. |
| 8,490,707 B2 | 7/2013 | Robisson et al. |
| 8,499,827 B2 | 8/2013 | Dusterhoft et al. |
| 8,511,361 B2 | 8/2013 | Guest |
| 8,517,184 B2 | 8/2013 | Carrejo et al. |
| 8,528,640 B2 | 9/2013 | Agrawal |
| 8,540,032 B2 | 9/2013 | Nutley et al. |
| 8,551,274 B2 | 10/2013 | Guest |
| 8,579,025 B2 | 11/2013 | Holderman et al. |
| 8,651,179 B2 | 2/2014 | Vaidya et al. |
| 8,664,318 B2 | 3/2014 | Guest et al. |
| 8,678,100 B2 | 3/2014 | Guest et al. |
| 8,684,075 B2 * | 4/2014 | Guest ................ B21F 45/008 |
| | | 166/207 |
| 8,701,757 B2 | 4/2014 | Greci |
| 8,720,590 B2 | 5/2014 | Guest et al. |
| 8,721,958 B2 | 5/2014 | Guest |
| 8,783,349 B2 * | 7/2014 | Robisson ............ E21B 43/103 |
| | | 166/278 |
| 8,850,706 B2 | 10/2014 | Bonner et al. |
| 8,875,784 B2 | 11/2014 | Kuo et al. |
| 8,876,944 B2 | 11/2014 | Ren et al. |
| 8,939,222 B2 | 1/2015 | Ren et al. |
| 8,980,799 B2 * | 3/2015 | Agrawal ................ E21B 43/02 |
| | | 507/221 |
| 9,044,914 B2 | 6/2015 | Guest et al. |
| 9,051,805 B2 | 6/2015 | Johnson et al. |
| 9,068,437 B2 | 6/2015 | Carrejo et al. |
| 9,090,012 B2 | 7/2015 | Mazyar et al. |
| 9,155,983 B2 | 10/2015 | Guest et al. |
| 9,174,151 B2 | 11/2015 | Lopez et al. |
| 9,212,541 B2 | 12/2015 | Richard et al. |
| 9,243,473 B2 | 1/2016 | Yang et al. |
| 9,322,249 B2 | 4/2016 | Fripp et al. |
| 9,388,671 B2 | 7/2016 | Holderman |
| 9,399,902 B2 | 7/2016 | Greci |
| 9,434,026 B2 | 9/2016 | Koli et al. |
| 9,441,458 B2 | 9/2016 | Carrejo et al. |
| 9,441,462 B2 | 9/2016 | Chakraborty et al. |
| 9,725,988 B2 | 8/2017 | Gano |
| 9,777,548 B2 | 10/2017 | Prieto et al. |
| 9,878,486 B2 | 1/2018 | Liu et al. |
| 10,072,482 B2 | 9/2018 | Hodge et al. |
| 10,107,093 B2 | 10/2018 | Yeh et al. |
| 10,184,323 B2 | 1/2019 | Kim et al. |
| 10,435,554 B2 | 10/2019 | Yun et al. |
| 10,443,339 B2 | 10/2019 | Yun et al. |
| 10,450,844 B2 | 10/2019 | Kim et al. |
| 10,487,630 B2 | 11/2019 | Davis et al. |
| 10,508,185 B2 | 12/2019 | Murugesan et al. |
| 10,577,896 B2 | 3/2020 | Dowsett et al. |
| 10,767,449 B2 | 9/2020 | Lazo et al. |
| 10,781,672 B2 | 9/2020 | Lazo et al. |
| 10,781,673 B2 | 9/2020 | Kim et al. |
| 10,781,674 B2 | 9/2020 | Bourgneuf et al. |
| 11,060,382 B2 | 7/2021 | Sherman |
| 2003/0089495 A1 | 5/2003 | Bixenman |
| 2004/0138321 A1 * | 7/2004 | Hashimoto ............ C08J 9/0061 |
| | | 521/134 |
| 2004/0261994 A1 | 12/2004 | Nguyen et al. |
| 2005/0034860 A1 | 2/2005 | Lauritzen |
| 2005/0056425 A1 | 3/2005 | Grigsby et al. |
| 2006/0175065 A1 | 8/2006 | Ross |
| 2006/0185849 A1 | 8/2006 | Edwards et al. |
| 2007/0012444 A1 | 1/2007 | Horgan et al. |
| 2008/0035330 A1 | 2/2008 | Richards |
| 2008/0083493 A1 | 4/2008 | Ridges et al. |
| 2008/0217002 A1 | 9/2008 | Simonds et al. |
| 2008/0264647 A1 | 10/2008 | Li |
| 2009/0151942 A1 | 6/2009 | Bernardi, Jr. |
| 2009/0173497 A1 | 7/2009 | Dusterhoft |
| 2010/0069469 A1 | 3/2010 | Young et al. |
| 2010/0089565 A1 * | 4/2010 | Duan ............... E21B 43/082 |
| | | 166/278 |
| 2010/0252254 A1 | 10/2010 | Nutley et al. |
| 2010/0258302 A1 | 10/2010 | Bonner et al. |
| 2011/0086942 A1 | 4/2011 | Robisson et al. |
| 2011/0098202 A1 | 4/2011 | James et al. |
| 2011/0201750 A1 * | 8/2011 | Harrington .......... C08K 5/0016 |
| | | 524/565 |
| 2011/0232901 A1 | 9/2011 | Carrejo et al. |
| 2011/0247813 A1 | 10/2011 | Moen |

(56) References Cited

U.S. PATENT DOCUMENTS

| | | |
|---|---|---|
| 2011/0303411 A1 | 12/2011 | Todd et al. |
| 2012/0017134 A1 | 1/2012 | Lee et al. |
| 2012/0211226 A1* | 8/2012 | Guest ................ E21B 33/1277 166/278 |
| 2013/0032969 A1 | 2/2013 | Guest et al. |
| 2013/0092394 A1* | 4/2013 | Holderman ............ E21B 34/08 166/205 |
| 2013/0161026 A1 | 6/2013 | Garza et al. |
| 2013/0292117 A1* | 11/2013 | Robisson ............ E21B 43/103 166/227 |
| 2014/0020910 A1 | 1/2014 | Falkner et al. |
| 2014/0332220 A1 | 11/2014 | Garza et al. |
| 2016/0035456 A1* | 2/2016 | Sauro ...................... H01B 1/24 252/511 |
| 2016/0115759 A1 | 4/2016 | Richards et al. |
| 2017/0114621 A1 | 4/2017 | Holderman et al. |
| 2017/0254170 A1 | 9/2017 | Mazyar et al. |
| 2017/0349747 A1* | 12/2017 | Sherman ................ C08L 29/04 |
| 2017/0362922 A1 | 12/2017 | Lazo et al. |
| 2018/0119526 A1 | 5/2018 | Lopez et al. |
| 2019/0023979 A1 | 1/2019 | Crews et al. |
| 2020/0408073 A1 | 12/2020 | Weirich et al. |
| 2021/0340361 A1* | 11/2021 | Anantha Narayana Iyer .............. B32B 1/08 |
| 2022/0003081 A1* | 1/2022 | Kovalchuk ............ E21B 43/02 |
| 2022/0003083 A1 | 1/2022 | Sadana et al. |
| 2022/0003084 A1 | 1/2022 | Kovalchuk et al. |
| 2022/0127934 A1* | 4/2022 | Yun ...................... E21B 43/082 |
| 2023/0151173 A1* | 5/2023 | Flores Perez .......... B29C 44/50 166/376 |
| 2023/0416594 A1* | 12/2023 | Xiang .................. C08L 15/005 |

FOREIGN PATENT DOCUMENTS

| | | | |
|---|---|---|---|
| CN | 2903364 | Y | 5/2007 |
| CN | 201794569 | U | 4/2011 |
| CN | 103620158 | A | 3/2014 |
| CN | 203476296 | U | 3/2014 |
| CN | 204267001 | U | 4/2015 |
| CN | 108086963 | A | 5/2018 |
| CN | 111218021 | A * | 6/2020 |
| CN | 111253610 | A * | 6/2020 |
| CN | 111499966 | A | 8/2020 |
| CN | 211201905 | U | 8/2020 |
| CN | 112459750 | A | 3/2021 |
| CN | 213450304 | U | 6/2021 |
| CN | 114412422 | A | 4/2022 |
| CN | 114542042 | A | 5/2022 |
| CN | 217421130 | U | 9/2022 |
| EA | 009070 | B1 | 10/2007 |
| EP | 1162055 | B1 | 4/2004 |
| EP | 2561179 | A2 | 2/2013 |
| EP | 2334899 | B1 | 12/2014 |
| EP | 2480752 | B1 | 7/2017 |
| GB | 2421527 | B | 2/2009 |
| RU | 2559973 | C1 | 8/2015 |
| WO | 2009045656 | A1 | 4/2009 |
| WO | 2012166234 | A1 | 12/2012 |
| WO | WO-2013165668 | A1 * | 11/2013 ............. E21B 43/08 |
| WO | 2015041819 | A1 | 3/2015 |
| WO | 2015056260 | A1 | 4/2015 |
| WO | 2016032621 | A1 | 3/2016 |
| WO | 2016137439 | A1 | 9/2016 |
| WO | 2017155868 | A1 | 9/2017 |
| WO | WO-2018162717 | A1 * | 9/2018 ............. C08J 9/0061 |
| WO | 2019055166 | A1 | 3/2019 |
| WO | 2019083461 | A1 | 5/2019 |
| WO | 2020068409 | A1 | 4/2020 |
| WO | 2020172092 | A1 | 8/2020 |
| WO | 2021203799 | A1 | 10/2021 |

OTHER PUBLICATIONS

Carrejo, et al., "The Effects of Dynamic Loading on the Sand Management and Permeability of Shape Memory Polymer and Gravel Packs for Sand Management Applications", SPE 143060—Brasil Offshore, Macae, Brazil, Jun. 14-17, 2011, 9 pages.

Crossland, et al., "A Bicontinuous Double Gyroid Hybrid Solar Cell", Nano Letters, vol. 9 {8}, 2009, pp. 2807-2812.

Wang, et al., "Co-Continuous Composite Materials for Stiffness, Strength, and Energy Dissipation", Advanced Materials, vol. 23 (13), Apr. 5, 2011, pp. 1524-1529.

Wei, et al., "Review shape memory materials and hybrid composites for smart systems", J. Mater. Sci., vol. 33, 1998, pp. 3763-3783.

Yuan, et al., "In-Situ Mechanical and Functional Behavior of Shape Memory Polymer Materials for Sand Management Applications", SPE 143204—Brasil Offshore, Macae, Brazil, Jun. 14-17, 2011, 10 pages.

Zalusky, et al., "Ordered Nanoporous Polymers from Polystyrene-Polylactide Block Copolymers", J. Am. Chem. Soc., vol. 124 (43), 2002, pp. 12761-12773.

International Search Report and Written Opinion issued in PCT/US2013/036100 on Jul. 10, 2013, 13 pages.

Gibson, et al., "Cellular Solids: Structure & Properties", Pergamon Press, Oxford, 1988, pp. 183.

Van Krevelen, et al., "Properties of Polymers", 4th Edition, Elsevier B.V., New York, 2009, pp. 611.

Anonymous, "GeoFORM Conformable Sand Management System Improve reliability through total conformance," Baker Hughes Incorporated, Brochure, 2011: 1-4.

Gibson et al., "(a) Linear elasticity," Cellular solids Structure and properties—Second Edition, Cambridge University Press: New York, 1999: p. 183.

International Preliminary Report on Patentability issued in PCT Application PCT/US2020/018495, dated Sep. 2, 2021 (10 pages).

International Search Report and Written Opinion issued in the PCT Application PCT/US2021/054334 dated Jan. 26, 2022 (11 pages).

International Search Report and Written Opinion issued in the PCT Application PCT/US2023/010451 dated Apr. 27, 2023, 10 pages.

ASTM D1418—Standard Practice for Rubber and Rubber Latices—Nomenclature, originally approved in 1956 (3 pages).

* cited by examiner

ELASTOMER ALLOY FOR INTELLIGENT SAND MANAGEMENT

CROSS-REFERENCE TO RELATED APPLICATIONS

The present application is a National Stage of International Application No. PCT/US2021/054334, filed Oct. 11, 2021, which claims priority benefit of U.S. Provisional Application No. 63/091,248, filed Oct. 13, 2020, the entirety of which is incorporated by reference herein and should be considered part of this specification.

BACKGROUND

In many hydrocarbon wells, inflowing fluid passes through a sand screen which filters out particulates from the inflowing oil or gas. The sand screen prevents sand from entering the wellbore and reduces damage that may occur by erosion. Conventionally, sand screens are made with a metallic mesh material. Once the sand screen is placed into the wellbore, gravel packs are pumped to fill the annulus between the screen and the formation.

In other instances, some metallic sand screens are expandable and are expanded downhole after placement in the wellbore. The result is a reduction in the annulus between the screen and the formation. The expandable screens in many instances have a limited expansion ratio, and the ability of the expandable screen to conform to borehole irregularities may not be satisfactory. Further, the ability of the expandable sand screen to resist borehole collapse may be reduced. Conventional sand screens are rated to resist greater external pressure than expandable sand screens. Expandable sand screens resist less external pressure because of plastic deformation experienced by their metallic components.

Recently, self-conformable polymer screens have been developed by using thermoplastic urethane (TPU) and implementing a shape memory concept. The polymeric screen has an open cell structure, which has been compressed. The polymeric screen is then placed into a wellbore and expanded by controlling the glass transition temperature of the polymeric material by utilizing an activation fluid, such as acetyl acetone, for example. The activation fluid is difficult to handle at the well site because the flash point of the activation fluid is relatively low, and a special formulation of the fluid is required. Once in the borehole, the polymeric TPU foam material softens and tries to return to its original expanded shape. The expansion outer diameter was designed to be higher than the borehole internal diameter, resulting in the TPU foam conforming to the entire length of an even irregularly shaped, e.g., open hole, borehole, which can circumvent the need to pump gravel slurry in a gravel packing operation. However, one of the disadvantages of the foam material used in these sand screens is the weak mechanical properties of these foams when expanded. The application is limited by the pressure and temperature rating. If an expanded foam fails during a downhole operation, well control may be lost. Further, screen collapse under wellbore pressure may lead to a loss of permeability and a stuck completion string in the wellbore, which may be difficult to repair or change.

WO2020/172092, which is incorporated by reference herein in its entirety, generally relates to using a non-metallic material with smart fillers for sand control applications. Using smart fillers allows the non-metallic materials to self-expand to conform to the irregular shape of the wellbore to facilitate sand control operations. There is a continuing need to improve permeability, robustness, and expandability of such non-metallic materials for sand control operations.

SUMMARY

An elastomer alloy according to one or more embodiments of the present disclosure includes a base polymer including hydrogenated nitrile butadiene rubber (HNBR), and at least one secondary polymer selected from the group consisting of: paraffin wax, low-density polyethylene (LDPE), linear low-density polyethylene (LLDPE), high-density polyethylene (HDPE), and a plastomer. In one or more embodiments of the present disclosure, the base polymer and the at least one secondary polymer are blended into a polymer matrix. The elastomer alloy according to one or more embodiments of the present disclosure also includes a plurality of smart fillers dispersed within the polymer matrix, at least one chemical foaming agent, and a curing activator.

A method of making an elastomer alloy according to one or more embodiments of the present disclosure includes blending a base polymer including HNBR and at least one secondary polymer into a polymer matrix, wherein the at least one secondary polymer is at least one selected from the group consisting of: paraffin wax, LDPE, LLDPE, HDPE, and a plastomer, dispersing a plurality of smart fillers within the polymer matrix, incorporating at least one chemical foaming agent into the polymer matrix, incorporating at least one curing activator into the polymer matrix, initiating a foaming reaction within the polymer matrix using the at least one chemical foaming agent, and initiating a curing reaction within the polymer matrix, wherein the steps of initiating the foaming reaction and initiating the curing reaction create an open cell structure within the polymer matrix.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims: the terms "up" and "down," "upper" and "lower," "upwardly" and "downwardly," "upstream" and "downstream," "uphole" and "downhole," "above" and "below," and other like terms indicating relative positions above or below a given point or element are used in this description to more clearly describe some embodiments of the disclosure.

The present disclosure generally relates to making and using an elastomer composite for sand control applications. More specifically, one or more embodiments of the present disclosure relate to an elastomer alloy that is able to expand from a compacted or compressed configuration once deployed downhole to conform to an irregularly shaped wellbore for sand control operations. Without the need for additional activation fluids, the elastomer alloy according to one or more embodiments of the present disclosure is much safer than conventional TPU materials. Moreover, the elastomer alloy according to one or more embodiments of the present disclosure also provides excellent thermal stability allowing it to be used at much higher temperatures, up to 150° C. for example, for long-term applications. In contrast, conventional TPU materials are only operable up to 85° C. As further described below, the elastomer alloy according to one or more embodiments of the present disclosure exhibits permeability, robustness, and an expansion ratio that are favorable for sand control operations.

Figure 1:
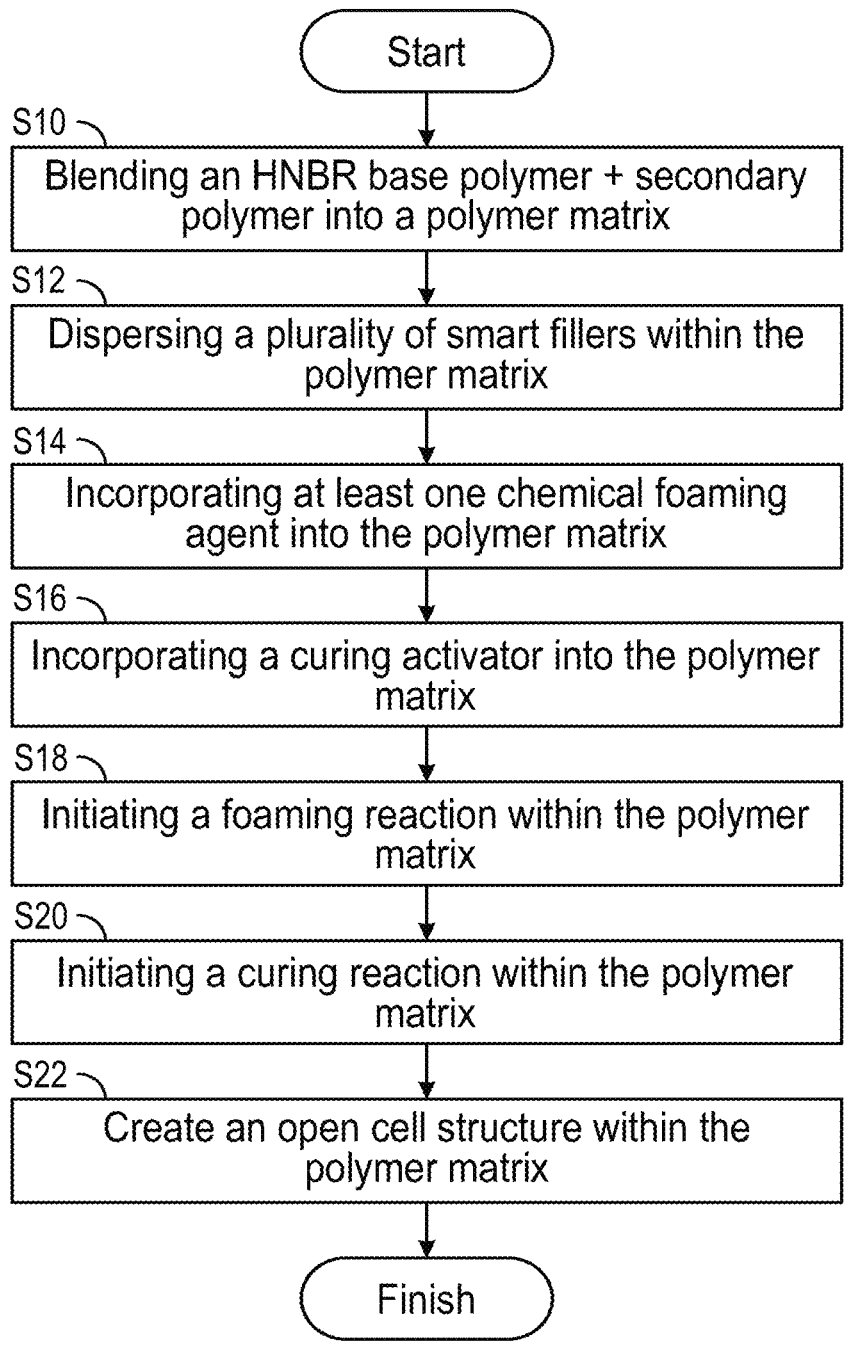
FIG. 1 shows a method of making an elastomer alloy according to one or more embodiments of the present disclosure.

Referring now to FIG. 1, a method of making an elastomer alloy according to one or more embodiments of the present disclosure is shown. Specifically, in step 510 of the method of making an elastomer alloy according to one or more embodiments of the present disclosure, a base polymer including hydrogenated nitrile butadiene rubber (HNBR) is blended with at least one secondary polymer into a polymer matrix. Advantageously, as a base polymer, HNBR has excellent thermal, mechanical, and chemical properties. For example, HNBR can typically be rated 30-40° ° C. higher than similar nitrile polymers due at least in part to a high level of saturation in the polymer backbone. According to one or more embodiments of the present disclosure, the at least one secondary polymer of the polymer matrix blend is at least one of paraffin wax, low-density polyethylene (LDPE), linear low-density polyethylene (LLDPE), high-density polyethylene (HDPE), or a plastomer, such as Engage, Elvaloy, or Affinity, for example. Advantageously, blending HNBR with the at least one secondary polymer into a polymer matrix in a method according to one or more embodiments of the present disclosure may create an elastomer alloy that is thermally stable at temperatures as high as 150° C., for example. In addition, enhanced mechanical and chemical properties realized by the elastomer polymer according to one or more embodiments of the present disclosure are further described below.

Still referring to FIG. 1, in step 512 of the method of making an elastomer alloy according to one or more embodiments of the present disclosure, a plurality of smart fillers are dispersed within the polymer matrix. According to one or more embodiments of the present disclosure, the plurality of smart fillers may include a swellable smart filler, for example, which increases in volume when deployed into well fluid or brine. According to one or more embodiments of the present disclosure, the swellable filler may include at least one of a super absorbent polymer (SAP), and MgO, for example. Specifically, SAP is a type of hydrophilic polymer (cross-linked hydrogel) having water-absorbing capacity from 100 g/g up to 2000 g/g, in which the absorbed water is scarcely removable even under pressure because the water molecules are held tightly in the network by hydrogen bonding. SAP may include a sodium salt of crosslinked polyacrylic acid such as LiquiBlock HS fines, for example, which are used to increase water uptake of the polymer and mainly contribute to water swelling of the elastomer alloy. These polymers may control the final state of swell of the elastomer alloy according to one or more embodiments of the present disclosure. Indeed, using a cross-linked polymer like SAP will facilitate the passage of water through the three-dimensional network of the structure, while retaining the polymer structure, which can force the structure to swell.

To control the rate of swell of the elastomer alloy due to swellable smart fillers, salt may be used to balance the osmotic pressure differential that might exist in a downhole condition. If the osmotic pressure is too high, the rate of swell will be excessive, and the structure of the elastomer may be damaged. In one or more embodiments of the present disclosure, micro-sized fine salt may be used in the formulation, and the salt may also act as a secondary swelling agent to increase the water uptake by the elastomer alloy.

As previously described, MgO may also be used as a swellable filler in one or more embodiments of the present disclosure. For example, Nalco D176 is an MgO high temperature expanding additive that reacts with water to form a crosslinked micro domain to stiffen the elastomer alloy according to one or more embodiments of the present disclosure. The reaction rate depends on the pH, temperature, pressure, and the polymer matrix of the elastomer alloy. In particular, MgO may be important for the elastomer alloy according to one or more embodiments of the present disclosure to increase the hardness of the elastomer with time so that the sand screen does not easily deform from differential pressure that may build up across the filter membrane during operation.

The SAPs that may be used in accordance with one or more embodiments of the present disclosure include cross-linked forms of polyacrylate (acrylic acid and acrylamide), polyvinyl alcohol, poly(ethylene oxide), starch-acrylate copolymer, carboxymethyl cellulose, and other hydrophilic swellable polymers. As understood by those having skill in the art, the degree of swelling and the swelling rate of SAPs depend on the type of cross-linked polymer, the conditions of the water with respect to pH, salinity, temperature, and pressure, the duration of immersion in a solution, and the design of the samples.

In addition to the swellable smart filler, the plurality of smart fillers may include at least one reinforcing smart filler according to one or more embodiments of the present also disclosure. Examples of a reinforcing smart filler according to one or more embodiments of the present disclosure include Portland cement, aluminous cement, fly ash, slag cement, MgO, ZnO, $Ca(OH)_2$, $ZnCl_2$, $MgCl_2$, $CaCl_2$, $CaCO_3$, $Na_2CO_3$, and $K_2CO_3$, for example.

Still referring to FIG. 1, in step 514 of the method of making an elastomer alloy according to one or more embodiments of the present disclosure, at least one chemical foaming agent (CFA) may be included into the polymer matrix. A chemical foaming agent is a chemical that decomposes and releases gases at a temperature above its decomposition temperature. Types of CFAs that may be used in the method according to one or more embodiments of the present disclosure include Azodicarbonamide (azo), sulfonyl hydrazide (OBSH, TSH, etc.) and sodium bicarbonate, for example. In particular, sodium bicarbonate, an inorganic foaming agent, may advantageously release carbon dioxide during a foaming reaction to facilitate the creation of an open cell foam. Due to its low compatibility with an elastomer matrix, sodium bicarbonate wants to escape from the polymer, leaving behind open and connected pores in the foamed parts, in one or more embodiments of the present disclosure. Moreover, a combination of organic and inorganic CFAs (e.g., sodium bicarbonate and an azo-based organic foaming agent) may be incorporated into the polymer matrix to act synergistically to create an open porous structure in the method according to one or more embodiments of the present disclosure.

Still referring to FIG. 1, in step 516 of the method of making an elastomer alloy according to one or more embodiments of the present disclosure, a curing activator may be incorporated into the polymer matrix. As further described below, two ways of vulcanizing or curing elastomer compound according to one or more embodiments of the present disclosure include sulfur curing and peroxide curing, for example. The curing activator activates either sulfur curing or peroxide curing and decomposition of the CFA with respect to the curing and foaming reactions of the method according to one or more embodiments of the present disclosure, as further described below.

Still referring to FIG. 1, in steps 518 and 520 of the method of making an elastomer alloy according to one or more embodiments of the present disclosure, foaming and curing reactions may be initiated within the polymer matrix. In the method according to one or more embodiments of the present disclosure, steps 518 and 520 may be balanced such that the curing reaction trails behind the foaming reaction in order to create an open cell structure within the polymer matrix (522). Indeed, in order to create an open cell sponge, it is essential to balance the reaction between curing and blowing (i.e., foaming).

In an example for making an elastomer alloy for a swellable sand screen according to one or more embodiments of the present disclosure, about 5-15 parts per hundred of rubber (PHR) of sodium bicarbonate is incorporated with about 1-5 PHR of azo-based organic foaming agent in the presence of 0.5-1.5 PHR curing activator such as Rhenogran Geniplex-70 in a sulfur cured formulation. Specifically, Geniplex-70 is a zinc dicyanato diamine based inorganic isocyanate that can be used to activate sulfur curing and decomposition of an azo foaming agent during the foaming and curing reaction steps (518,520) of the method according to one or more embodiments of the present disclosure.

To initiate sulfur curing, elemental sulfur or sulfur donors are needed. In one or more embodiments of the present disclosure, a sulfur donor is selected for use over elemental sulfur insofar as sulfur donors react to contribute primarily mono and disulphidic bridges that have much higher heat resistance to a polysulphidic bridge formed by elemental sulfur. According to one or more embodiments of the present disclosure, Rhenogran CLD-80, a sulfur donor that does not generate carcinogenic N-nitrosamines during vulcanization, is used for example. Moreover, when Rhenogran CLD-80 is used as the sulfur donor, the resulting vulcanizates do not show any blooming. In a method according to one or more embodiments of the present disclosure, to control the rate of curing and the state of curing, primary and secondary accelerators such as thiurams (tetramethylthiuram disulfide (TMTD), tetraethylthiuram disulfide (TETD), etc.), thiazoles (zinc salt of 2-mercaptobenzothiazole (ZMBT), 2-mercaptobenzothiazole (MBT), 2,2'-benzothiazolyl disulfide (MBTS), etc.) or sulfonamides (carboxybenzenesulfonamide (CBS), N-tert-butyl-benzothiazole sulfonamide (TBBS), N,N-Dicyclohexyl-2-benzothiazolsulfene amide (DCBS), etc.) may be used to balance the reaction speed (scorch time) and curing time. In this example, secondary accelerators such as MBTS may be used to provide scorch resistance and to delay the reaction of curing to slightly trail behind the reaction of blowing, which facilitates creation of the open cell structure within the polymer matrix (522). According to one or more embodiments of the present disclosure, the curing reaction may trail behind the blowing or foaming reaction by about 15 minutes, 10 minutes, 5 minutes, 2 minutes, 1 minute, 30 seconds, 20 seconds, 10 seconds, 5 seconds, 3 seconds, 2 seconds, or 1 second, for example.

Figure 2B:
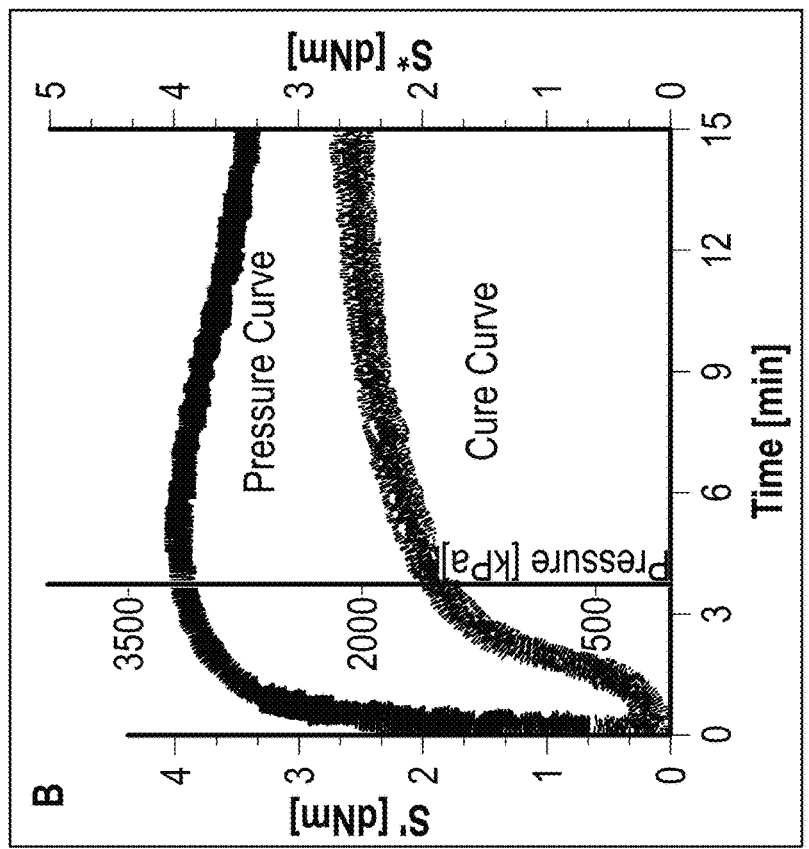
FIG. 2B shows pressure and cure curves of a sulfur cured elastomer alloy according to one or more embodiments of the present disclosure.
Figure 2A:
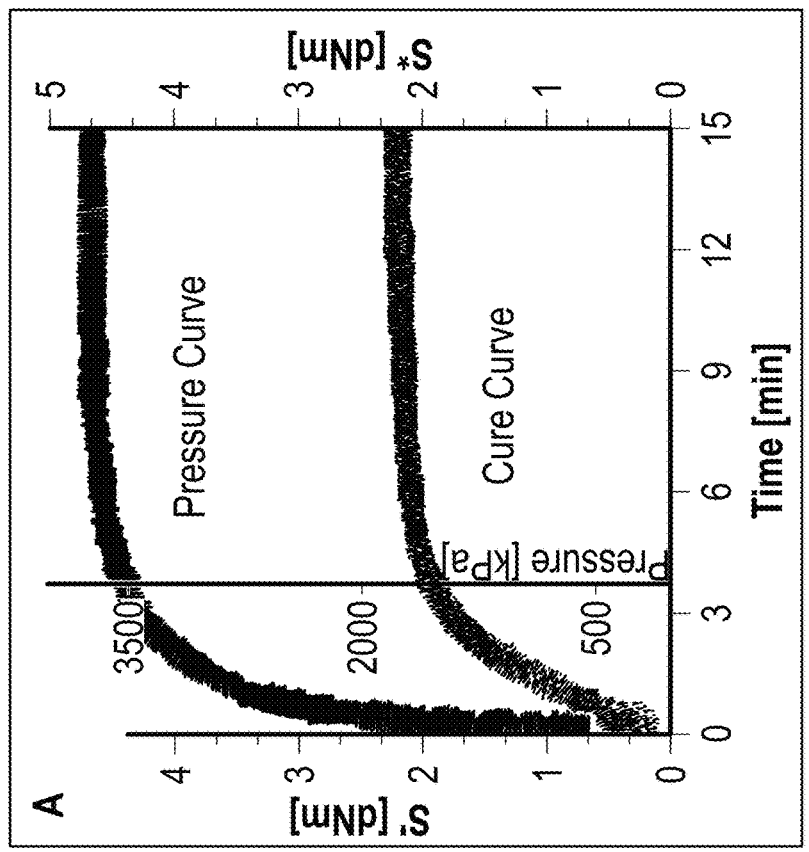
FIG. 2A shows pressure and cure curves of a peroxide cured elastomer alloy, according to one or more embodiments of the present disclosure.

Instead of using a curing activator that includes sulfur for sulfur curing as previously described with respect to steps 516 and 520 in a method according to one or more embodiments of the present disclosure, a curing activator that includes peroxide for peroxide curing may be used in a method according to one or more embodiments of the present disclosure. For example, dicumyl peroxide may be used as the curing activator to facilitate peroxide curing according to one or more embodiments of the present disclosure. For example, FIGS. 2A and 2B show pressure and cure curves of a peroxide cured elastomer alloy and a sulfur cured elastomer alloy, respectively, according to one or more embodiments of the present disclosure. To obtain the comparative data provided in FIGS. 2A and 2B, both peroxide cured (A) and sulfur cured (B) samples were cured at approximately 177°C for approximately 15 minutes, and a rubber process analyzer (RPA2000) was used to characterize both samples to evaluate the pressure rise due to foaming and elastic torque rise due to curing (S'). As shown in FIGS. 2A and 2B, the pressure curve represents the pressure rise with time, and the cure curve represents the elastic torque rise. For both of the peroxide cured (FIG. 2A) and the sulfur cured (FIG. 2B) samples, pressure rise occurs ahead of curing. As further shown, pressure rise starts to trend down for the sulfur cured sample (FIG. 2B), while the pressure remains relatively flat for the duration of the test for the peroxide cured sample (FIG. 2A). The test results suggest that during the foaming reaction of the sulfur cured sample (FIG. 2B), more open cell and connected pore structure were created, causing the gases to gradually permeate out of the sample during the test. In contrast, pores created in the peroxide cured sample (FIG. 2A) were more isolated. As such, the gases generated by the foaming agent of the peroxide cured sample (FIG. 2A) remained trapped in the cells with no place to escape, resulting in the relatively flat pressure curve shown in FIG. 2A.

Moreover, elastomer alloys cured by peroxide and sulfur according to one or more embodiments of the present disclosure may have very different properties including modulus and elongation at break. For example, in one or more embodiments of the present disclosure, the sulfur cured elastomer alloy may have a much higher elongation at break than a similarly processed peroxide cured elastomer alloy due in part to the short and more flexible disulphidic bond that forms during sulfur curing in contrast with the short and rigid C—C bond that forms during peroxide curing. The more flexible and soft nature of S—S bonds of the sulfur cured elastomer alloy may allow gases to escape easier than the more rigid and short C—C bonds of the peroxide cured elastomer alloy. As such, the sulfur cured elastomer alloy according to one or more embodiments of the present disclosure may have a more porous open cell structure after the curing reaction is completed.

Figure 3A:
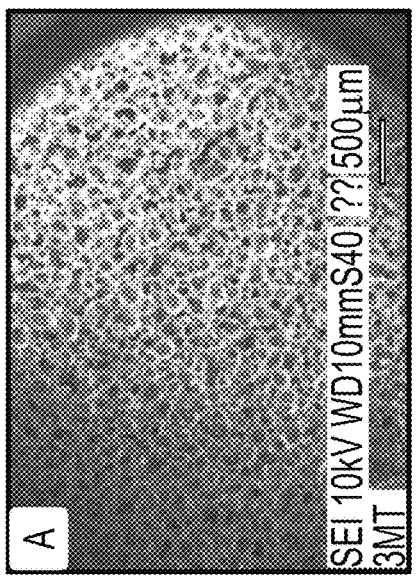
FIG. 3A shows scanning electron microscopic (SEM) images of the pore structure morphology of a peroxide cured elastomer alloy in order of increasing magnification according to one or more embodiments of the present disclosure.
Figure 3A:
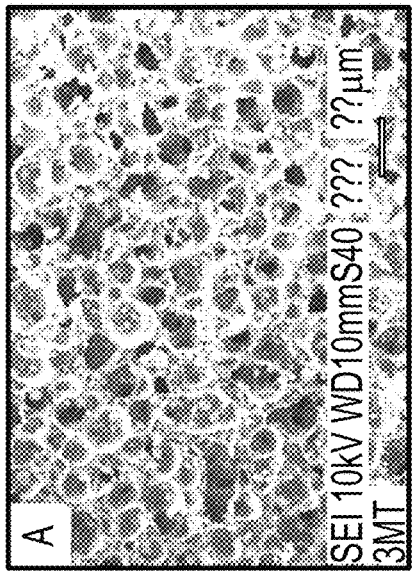
Figure 3A:
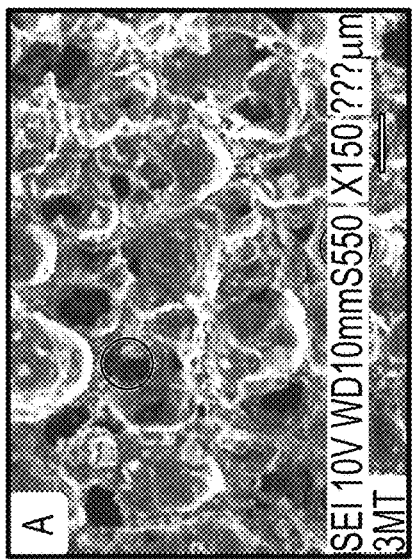
Figure 3B:
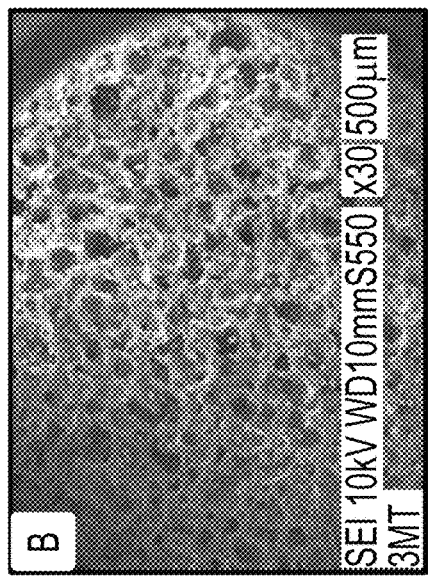
FIG. 3B shows SEM images of the pore structure morphology of a sulfur cured elastomer alloy in order of increasing magnification according to one or more embodiments of the present disclosure.
Figure 3B:
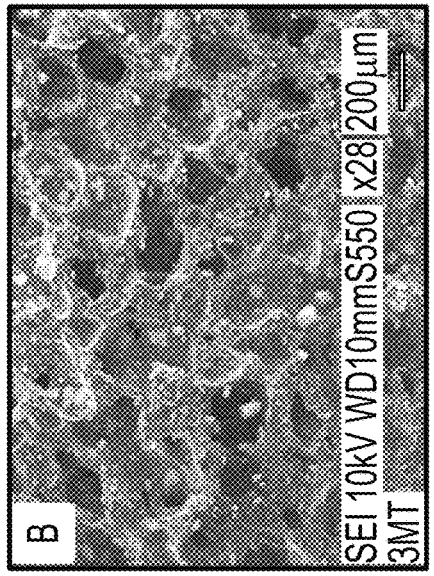
Figure 3B:
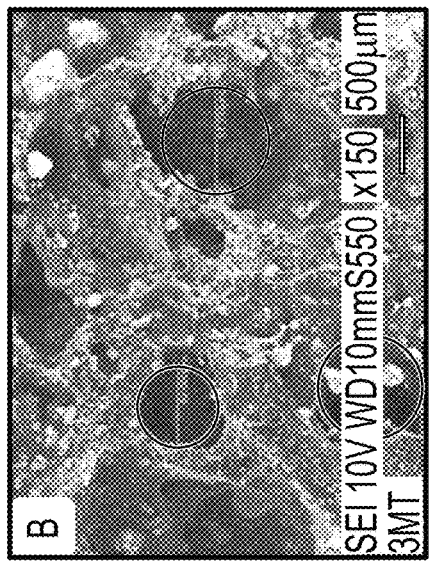

Referring now to FIGS. 3A and 3B, the morphological differences between the peroxide cured sample FIG. 3A and the sulfur cured sample FIG. 3B are shown in detail. Specifically, FIG. 3A shows SEM images of the pore structure morphology of a peroxide cured elastomer alloy in order of increasing magnification according to one or more embodiments of the present disclosure, and FIG. 3B shows SEM images of the pore structure morphology of a sulfur cured elastomer alloy in order of increasing magnification according to one or more embodiments of the present disclosure. As shown, the pore structure of the sulfur cured elastomer alloy shown in FIG. 3B is generally larger and generally has a more connected port throat than the peroxide cured elastomer alloy shown in FIG. 3A, which is evidence that the sulfur cured elastomer alloy shown in FIG. 3B may have a higher open cell content than the peroxide cured elastomer alloy shown in FIG. 3A.

Moreover, during a permeability test, the sulfur cured elastomer alloy of FIG. 3B exhibited greater permeability than the peroxide cured elastomer alloy of FIG. 3A. For example, during the permeability test, a measure of brine water was poured on top of samples of the peroxide cured elastomer alloy of FIG. 3A and the sulfur cured elastomer alloy of FIG. 3B. While the sulfur cured elastomer alloy sample had immediate leaking from the bottom of the sample after the brine water was poured, the peroxide cured elastomer alloy sample exhibited zero leaking even after several days. In view of the above, either a peroxide cured elastomer alloy or a sulfur cured elastomer alloy may be made and used in one or more embodiments of the present disclosure depending on the open cell, modulus, elongation, and permeability requirements of the particular application.

In addition to the above, the elastomer alloy according to one or more embodiments of the present disclosure may include an antioxidant, which may improve the ageing properties of the rubber. While a downhole environment may be depleted of free oxygen, dissolved oxygen could still exist and attack the polymer sand screen, causing degradation, oxidation, and embrittlement of the material at an elevated temperature. Types of antioxidants that may be used in the elastomer alloy according to one or more embodiments of the present disclosure include an amine and/or imidazole based compound such as VANOX® CDPA and ZMTI, which may work synergistically to improve the overall heat aging properties of the elastomer alloy.

In addition to the above, the elastomer alloy according to one or more embodiments of the present disclosure may include a process aid, which may be an oil or dry liquid concentrate compounded into the elastomer alloy to improve processability by lowering the viscosity of the elastomer alloy. Types of process aids that are compatible with nitrile based compounds, such as the elastomer alloy according to one or more embodiments of the present disclosure, include Paraplex G-25, Plasthall TOTM, Plasthall P-7092, Hallstar Dioplex 100, and Paraplex G-57, for example.

Figure 4A:
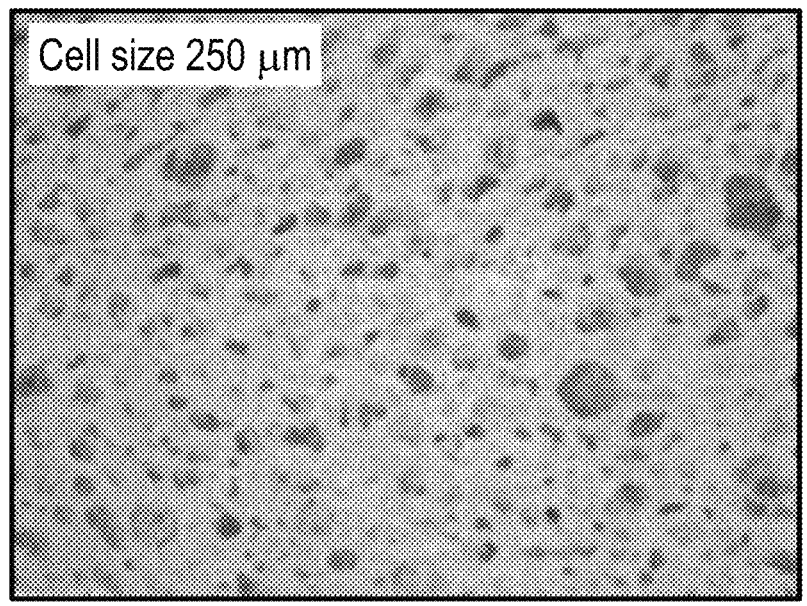
FIGS. 4A-4B show comparative samples of a swellable elastomer (FIG. 4A) and a swellable elastomer alloy (FIG. 4B) according to one or more embodiments of the present disclosure.
Figure 4B:
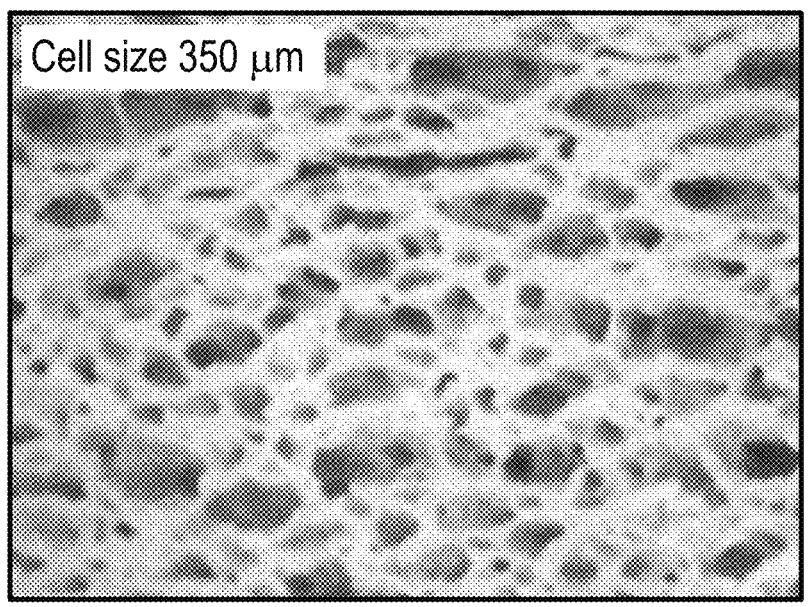

Referring now to FIGS. 4A-4B, comparative samples of a swellable elastomer (FIG. 4A) and a swellable elastomer alloy (FIG. 4B) according to one or more embodiments of the present disclosure are shown. Specifically, the FIG. 4A sample shows a swellable elastomer including HNBR, a plurality of smart fillers such as swellable smart filters, at least one chemical foaming agent, and a curing activator, for example. This swellable elastomer sample has an individual cell size of about 250 microns, as shown. In contrast, the FIG. 4B sample shows a swellable elastomer alloy having the same ingredients as the swellable elastomer of FIG. 4A except the swellable elastomer alloy of FIG. 4B also includes a secondary polymer blended with the HNBR into a polymer matrix, according to one or more embodiments of the present disclosure. As shown in FIG. 4B, this swellable elastomer alloy has an individual cell size of about 350 microns. Accordingly, the comparative samples of the swellable elastomer (FIG. 4A) and the swellable elastomer alloy (FIG. 4B) show that the individual cell size of the foam increases with alloying. This increase in individual cell size from the swellable elastomer (FIG. 4A) to the swellable elastomer alloy (FIG. 4B) provide evidence that the swellable elastomer alloy according to one or more embodiments of the present disclosure exhibits greater permeability than elastomers having only HNBR as the base polymer in the polymer matrix. Indeed, the swellable elastomer shown in FIG. 4A has a permeability of 0.13 Darcy, and the swellable elastomer alloy shown in FIG. 4B has a permeability of 13 Darcy. Permeability values over 10 Darcy are contemplated by the scope of the elastomer alloy according to one or more embodiments of the present disclosure.

Figure 5:
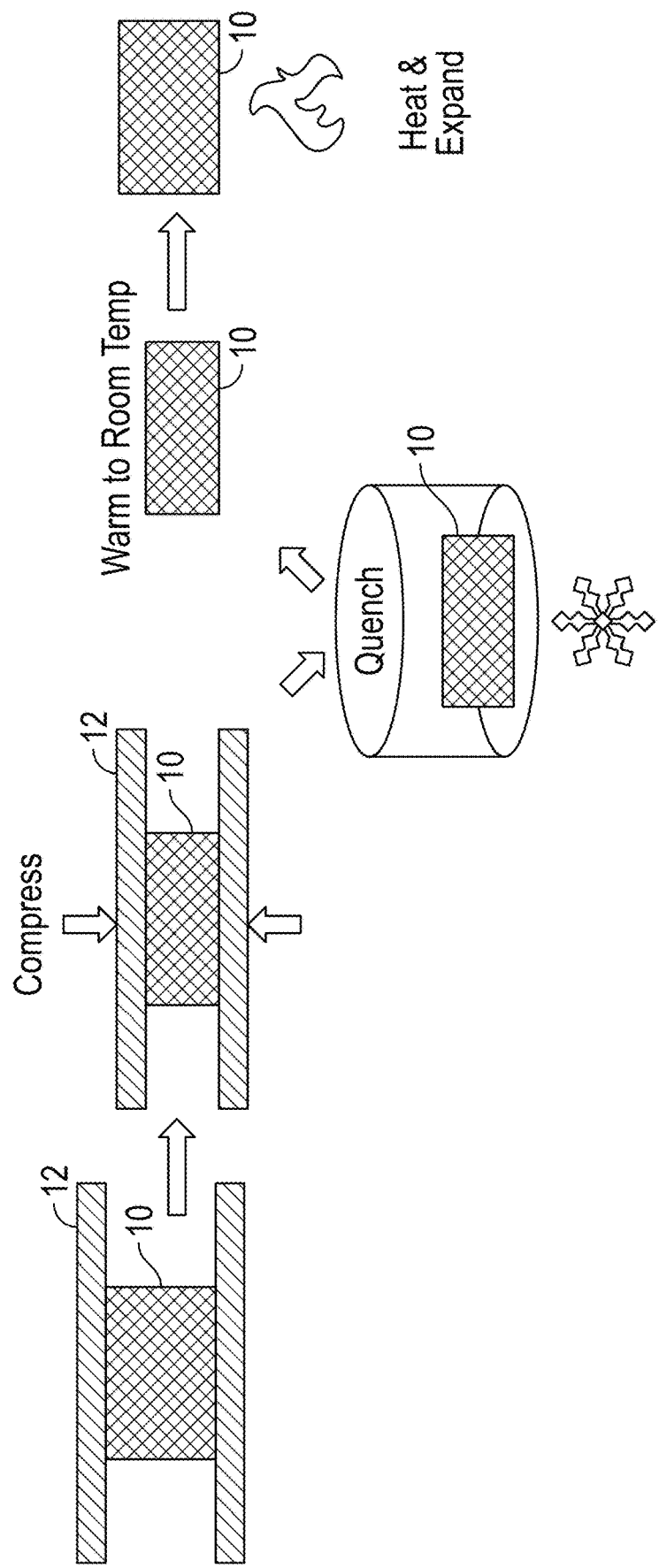
FIG. 5 shows an expansion mechanism for the elastomer alloy according to one or more embodiments of the present disclosure.

Referring now to FIG. 5, an expansion mechanism for the elastomer alloy according to one or more embodiments of the present disclosure is shown. As previously described, one or more embodiments of the present disclosure are related to an elastomer alloy that is able to expand from a compacted or compressed configuration once deployed downhole to conform to an irregularly shaped wellbore for sand control operations. For such applications, the ability of a sand screen made from an elastomer alloy to expand once deployed downhole to conform to the wellbore is critical. As shown in the expansion mechanism of FIG. 5, the elastomer alloy 10 according to one or more embodiments of the present disclosure may be installed in a jig 12, and the elastomer alloy 10 and the jig 12 may be heated to about 85° C. to soften the elastomer alloy 10. Thereafter, the jig 12 may compress the elastomer alloy 10 at about a 63% compression ratio, while the temperature is maintained at about 85° C. for about 1 hour. Thereafter, the jig 12 may be removed, and the elastomer alloy 10 may be quenched in chilled water or chilled air having a temperature between about −20° C. and 20° C. Thereafter, the elastomer alloy 10 may be removed from the chilled water or chilled air and allowed to warm up to room temperature. Thereafter, the elastomer alloy 10 may be heated up to 105° C., thereby expanding the elastomer alloy 10 in air.

Figure 6:
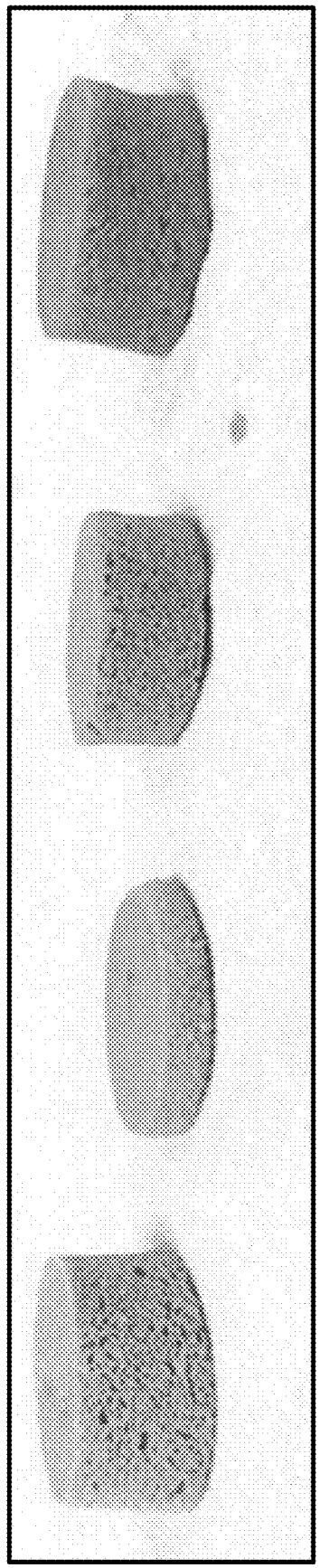
FIG. 6 shows examples of compressed and expanded elastomer alloy samples according to one or more embodiments of the present disclosure.

Referring now to FIG. 6, the elastomer alloy 10 according to one or more embodiments of the present disclosure is shown as an initial sample (i.e., an as is button), in a compressed configuration, in an expanded in (heated) air configuration, and in an expanded configuration in which the elastomer alloy 10 was allowed to swell in hydrocarbon oil. These various configurations of the elastomer alloy 10 may mimic the configurations of the elastomer alloy 10 downhole according to one or more embodiments of the present disclosure. For example, with respect to the compressed configuration, which may be maintained after the elastomer alloy 10 is quenched in chilled water or chilled air as previously described, may be sustainably maintained with a mechanical retainer according to one or more embodiments of the present disclosure. The mechanical retainer may be a degradable polymeric wrapping tape, for example. Upon exposure to a wellbore condition downhole, the mechanical retainer may release from the elastomer alloy or may simply dissolve, for example.

Of note, the expansion ratio in air at 105° C. in the thickness direction of the elastomer alloy 10 sample of FIG. 6 is 130%, while the expansion ratio reached 190% for the elastomer alloy 10 sample expanded in the hydrocarbon oil. The additional expansion in hydrocarbon oil is due to swelling of the elastomer alloy at the same temperature. For example, in one or more embodiments of the present disclosure, the plurality of smart fillers of the elastomer alloy may react with the polymer matrix when the elastomer alloy is in an expanded state after exposure to a wellbore condition. For comparison, a swellable elastomer sample having the same ingredients as the swellable elastomer alloy sample according to one or more embodiments of the present disclosure, except for the secondary polymer blended with the HNBR in the polymer matrix, only exhibited a 20% expansion ratio in about 105° C. air. As such, expansion ratio values above 20% are contemplated by the scope of the elastomer alloy according to one or more embodiments of the present disclosure.

Figure 7:
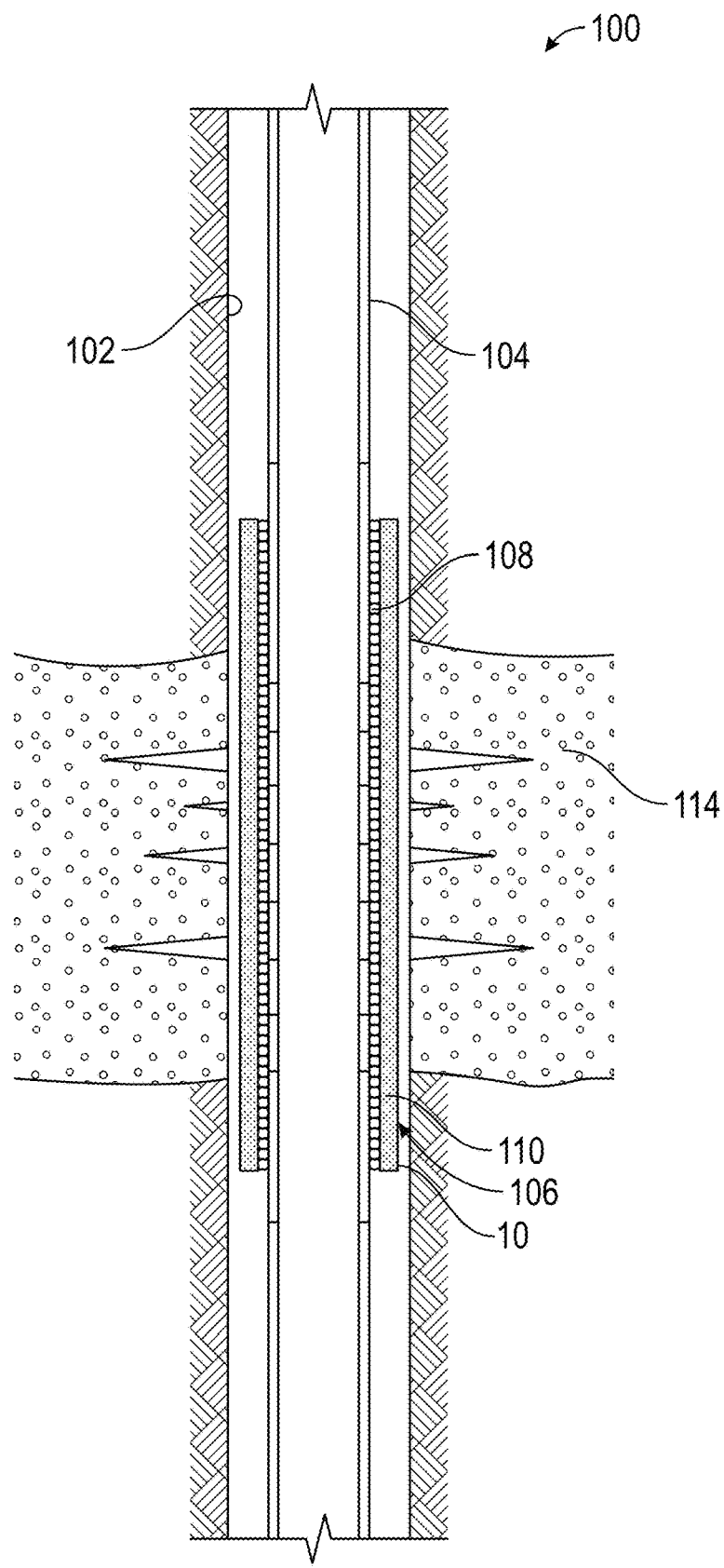
FIG. 7 is a sectional view of a sand screen positioned in a wellbore according to one or more embodiments of the present disclosure.

Referring now to FIG. 7, a sectional view of a sand screen positioned in a wellbore according to one or more embodiments of the present disclosure is shown. Specifically, the wellbore 100 includes an open bore hole 102, a production tubing string 104, which may be a base pipe according to one or more embodiments, and a sand screen 106. While wellbore 100 is illustrated as being a substantially vertical, uncased well, it should be recognized that the subject disclosure is equally applicable for use in cased wellbores as well as in horizontal and/or inclined wellbores. The sand screen 106 includes a filter member 108 and a compliant material, such as the elastomer alloy 10 according to one or more embodiments of the present disclosure. The sand screen 106 is shown positioned in the wellbore 100 adjacent a producing formation 114. According to one or more embodiments of the present disclosure, the elastomer alloy 10, which is a highly permeable open cell foam, as previously described, may be the only filtration agent without the use of any filter member 108. In one or more embodiments of the present disclosure, the filter member 108 can be configured for structural support of the elastomer alloy 10.

Still referring to FIG. 7, in a well completion method according to one or more embodiments of the present disclosure, at least one base pipe 104 may be covered with the elastomer alloy 10 according to one or more embodiments of the present disclosure. The elastomer alloy 10 covering the base pipe 104 may be compressed with a mechanical retainer before running the base pipe 104 to a location in the wellbore 100. Upon exposure to a condition in the wellbore 100, the elastomer alloy 10 covering the base pipe 104 may expand due to reaction of the one or more smart fillers, and release or degradation of the mechanical retainer, as previously described. In one or more embodiments, the smart fillers swell and/or stiffen the elastomer alloy 10 during expansion. As the elastomer alloy 10 expands into and fills the annulus, the elastomer alloy 10 conforms to a wall of the wellbore 100. Because the elastomer alloy 10 is able to conform to the wellbore 100 wall in this way, the elastomer alloy 10 is able to filter debris including sand from fluids from the producing formation 114 to the base pipe 104. After the downhole operation is complete, the elastomer alloy 10 may be detached from the base pipe 104, and the base pipe 104 may be lifted out of the wellbore 100.

Advantageously, blending the HNBR base polymer and at least one secondary polymer into the polymer matrix creates an elastomer alloy having an open cell structure that exhibits higher permeability than elastomers that only include the HNBR as the base polymer in the polymer matrix, for example. The elastomer alloys according to one or more embodiments of the present disclosure may also exhibit increased stiffness, apart from any reinforcing smart fillers, over elastomers having HNBR as the base polymer alone. Such increased stiffness improves the robustness and the durability of the elastomer alloy during running in hole, for example. Moreover, the elastomer alloy according to one or more embodiments of the present disclosure, exhibits a superior expansion ratio through heat activation over elastomers having HNBR as the base polymer alone.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. An elastomer alloy comprising:
   a base polymer comprising hydrogenated nitrile butadiene rubber (HNBR);
   at least one secondary polymer selected from the group consisting of low-density polyethylene (LDPE), linear low-density polyethylene (LLDPE), and high-density polyethylene (HDPE), wherein the base polymer and the at least one secondary polymer are blended into a polymer matrix;

a plurality of smart fillers dispersed within the polymer matrix;

at least one chemical foaming agent; and a curing activator, wherein a linear expansion ratio in a hydrocarbon oil at about 105° C. in a thickness direction of the elastomer alloy is greater than 20%.

2. The elastomer alloy of claim 1, wherein the plurality of smart fillers comprises at least one smart filler selected from the group consisting of a swellable filler and a reinforcing filler.

3. The elastomer alloy of claim 2, wherein the plurality of smart fillers comprises at least one swellable filler selected from the group consisting of a super absorbent polymer (SAP) and MgO.

4. The elastomer alloy of claim 2, wherein the plurality of smart fillers comprises at least one reinforcing filler selected from the group consisting of Portland cement, aluminous cement, fly ash, slag cement, MgO, ZnO, $Ca(OH)_2$, $ZnCl_2$, $MgCl_2$, $CaCl_2$), $CaCO_3$, $Na_2CO_3$, and $K_2CO_3$.

5. The elastomer alloy of claim 1, further comprising an antioxidant.

6. The elastomer alloy of claim 1, further comprising a process aid.

7. The elastomer alloy of claim 1, wherein the at least one chemical foaming agent comprises at least one chemical foaming agent selected from the group consisting of azodicarbonamide and sodium bicarbonate.

8. The elastomer alloy of claim 1, wherein the curing activator comprises at least one curing activator selected from the group consisting of sulfur and peroxide.

9. The elastomer alloy of claim 1, wherein the elastomer alloy is an open cell foam.

10. The elastomer alloy of claim 1, wherein a permeability coefficient of the elastomer alloy is greater than 10 Darcy.

11. The elastomer alloy of claim 1, wherein a linear expansion ratio in air at about 105° C. in the thickness direction of the elastomer alloy is greater than 20%.

12. A sand screen apparatus for use in a downhole operation for hydrocarbon recovery, the sand screen apparatus comprising:

an elastomer alloy having a compressed state and an expanded state, wherein the elastomer alloy comprises:

a base polymer comprising hydrogenated nitrile butadiene rubber (HNBR);

at least one secondary polymer selected from the group consisting of low-density polyethylene (LDPE), linear low-density polyethylene (LLDPE), and high-density polyethylene (HDPE), wherein the base polymer and the at least one secondary polymer are blended into a polymer matrix;

a plurality of smart fillers dispersed within the polymer matrix;

at least one chemical foaming agent; and a curing activator; and a mechanical retainer that compresses the elastomer alloy in the compressed state, wherein the plurality of smart fillers reacts with the polymer matrix in the expanded state after exposure to a wellbore condition.

13. The sand screen apparatus of claim 12, wherein the mechanical retainer is a degradable polymeric wrapping tape.

14. The sand screen apparatus of claim 13, wherein the wellbore condition causes the degradable polymeric wrapping tape to dissolve.

15. The sand screen apparatus of claim 12, wherein the wellbore condition causes the mechanical retainer to release from the elastomer alloy.

16. The sand screen apparatus of claim 12, wherein the elastomer alloy conforms to a wellbore in the expanded state.

17. A well completion method comprising:

covering at least one base pipe with an elastomer alloy, wherein the elastomer alloy comprises:

a base polymer comprising hydrogenated nitrile butadiene rubber (HNBR);

at least one secondary polymer selected from the group consisting of low-density polyethylene (LDPE), linear low-density polyethylene (LLDPE), and high-density polyethylene (HDPE), wherein the base polymer and the at least one secondary polymer are blended into a polymer matrix;

a plurality of smart fillers dispersed within the polymer matrix;

at least one chemical foaming agent; and a curing activator;

compressing the elastomer alloy with a mechanical retainer;

running the at least one base pipe to a location in a wellbore;

expanding the elastomer alloy;

conforming the elastomer alloy to a wall of the wellbore;

filtering fluids through the elastomer alloy to the at least one base pipe;

detaching the elastomer alloy from the at least one base pipe; and lifting the at least one base pipe out of the wellbore.

18. The well completion method of claim 17, wherein the one or the plurality of smart fillers comprises at least one smart filler selected from the group consisting of a swellable filler and a reinforcing filler.

19. The well completion method of claim 17, wherein the expanding step comprises releasing the mechanical retainer.

* * * * *